United States Patent
Basso et al.

(10) Patent No.: US 9,003,470 B2
(45) Date of Patent: *Apr. 7, 2015

(54) INTERACTION MODALITIES FOR MULTIMEDIA DELIVERY AND PRESENTATION

(71) Applicant: AT&T Intellectual Property II, L.P., Atlanta, GA (US)

(72) Inventors: Andrea Basso, N. Long Branch, NJ (US); Erich Haratsch, Holmdel, NJ (US); Barin Geoffry Haskell, Tinton Falls, NJ (US); Joern Ostermann, Red Bank, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/139,215

(22) Filed: Dec. 23, 2013

(65) Prior Publication Data

US 2014/0115107 A1 Apr. 24, 2014

Related U.S. Application Data

(60) Continuation of application No. 13/609,928, filed on Sep. 11, 2012, now Pat. No. 8,635,200, which is a continuation of application No. 11/931,196, filed on Oct. 31, 2007, now Pat. No. 8,266,128, which is a division of application No. 09/113,747, filed on Jul. 10, 1998, now Pat. No. 7,310,811.

(60) Provisional application No. 60/052,576, filed on Jul. 15, 1997.

(51) Int. Cl.
| | |
|---|---|
| H04N 7/173 | (2011.01) |
| H04L 29/08 | (2006.01) |
| H04N 21/2343 | (2011.01) |
| H04N 21/442 | (2011.01) |
| H04N 21/6371 | (2011.01) |
| H04N 21/6373 | (2011.01) |
| H04N 21/6377 | (2011.01) |
| H04N 21/6379 | (2011.01) |
| H04N 21/658 | (2011.01) |

(52) U.S. Cl.
CPC ............ *H04L 67/10* (2013.01); *H04N 21/2343* (2013.01); *H04N 7/17318* (2013.01); *H04N 21/44209* (2013.01); *H04N 21/4424* (2013.01); *H04N 21/6371* (2013.01); *H04N 21/6373* (2013.01); *H04N 21/6377* (2013.01); *H04N 21/6379* (2013.01); *H04N 21/658* (2013.01)

(58) Field of Classification Search
CPC ..... G06F 15/17; H04L 67/10; H04N 21/2343
USPC ...................... 709/231; 707/705; 725/120, 46
See application file for complete search history.

(56) References Cited

U.S. PATENT DOCUMENTS

| | | |
|---|---|---|
| 5,014,125 A | 5/1991 | Pocock et al. |
| 5,191,410 A | 3/1993 | McCalley et al. |
| 5,381,477 A | 1/1995 | Beyers, II et al. |
| 5,442,390 A | 8/1995 | Hooper et al. |
| 5,537,408 A | 7/1996 | Branstad et al. |

(Continued)

*Primary Examiner* — Jensen Hu

(57) ABSTRACT

A method and apparatus for displaying received data, analyze the quality of the displayed data formulating a media-parameter suggestion for the encoder to alter the characteristics of data to be sent to the receiver, and sending from the receiver, the formulated suggestion.

20 Claims, 4 Drawing Sheets

(56) References Cited

U.S. PATENT DOCUMENTS

| | | |
|---|---|---|
| 5,550,577 A | 8/1996 | Berbiest et al. |
| 5,574,843 A | 11/1996 | Gerlach, Jr. |
| 5,673,401 A | 9/1997 | Volk et al. |
| 5,794,018 A | 8/1998 | Vrvilo et al. |
| 5,828,382 A * | 10/1998 | Wilde ............... 345/552 |
| 5,867,230 A | 2/1999 | Wang et al. |
| 5,881,245 A | 3/1999 | Thompson |
| 5,928,330 A | 7/1999 | Goetz et al. |
| 5,933,141 A | 8/1999 | Smith |
| 5,983,004 A | 11/1999 | Shaw et al. |
| 6,008,836 A | 12/1999 | Bruck et al. |
| 6,172,673 B1 | 1/2001 | Lehtinen et al. |
| 6,233,017 B1 | 5/2001 | Chaddha |
| 6,233,590 B1 | 5/2001 | Shaw et al. |
| 6,295,530 B1 | 9/2001 | Ritchie et al. |
| 6,317,131 B2 | 11/2001 | Basso et al. |
| 6,349,297 B1 | 2/2002 | Shaw et al. |
| 6,526,575 B1 | 2/2003 | McCoy et al. |
| 2,242,867 A1 | 1/2007 | Ostermann et al. |

\* cited by examiner

INTERACTION MODALITIES FOR MULTIMEDIA DELIVERY AND PRESENTATION

PRIORITY CLAIM

The present application is a continuation of U.S. patent application Ser. No. 13/609,928, filed Sep. 11, 2012, which is a continuation of U.S. patent application Ser. No. 11/931,196, filed Oct. 31, 2007, which is a divisional of U.S. patent application Ser. No. 09/113,747, filed Jul. 10, 1998, which claims priority from U.S. Provisional Application No. 60/052,576, filed Jul. 15, 1997, the contents of which are incorporated herein by reference in their entirety.

FIELD OF THE INVENTION

The present invention relates to transferring information over a network. More particularly, the present invention relates to systems and methods for improving data flow based on user preferences.

BACKGROUND OF THE INVENTION

Remote interactivity is an important issue in both multimedia research and standards development. In the known art, when an encoder transmits multimedia data to a decoder, the status of the transmission can be determined at the decoder and then fed back, through a back channel, to the encoder.

Historically, many people were convinced that using a backchannel with real-time multimedia was either impractical or impossible. The concept of a back channel is known in the art. Currently, broad status reports are sent from a receiver to a transmitter. These status reports provide very general information to the transmitter, such as whether a terminal is receiving a transmission at all. Detailed information regarding how a transmission is received, or how a transmission is displayed, is typically not fed back to the transmission source. And typically, if this information is fed back to the transmission source, the transmitter may adjust the transmission or may not, but does so without regard to the receiver's individual preferences.

SUMMARY OF THE INVENTION

The prior art lacks a meaningful way of passing suggestions from the receiver to the sender to take certain actions to improve the quality of what is displayed based on the receiver's preferences.

As a context for the present invention, but not the only context, consider a server transmitting multimedia data to a client. It would be beneficial for the client to have some way of feeding information back to the server to maximize the quality of the multimedia transmission. For example, although not the only example, if a client desires to receive multimedia data from one or more servers, and the client is also running applications that consume memory and negatively impact on the way the multimedia data is displayed, the client would benefit from being able to suggest to the server various ways to alter the transmission such that the client's display is improved. Some examples of suggestions to the server, although not the only examples, include suggestions to cut out certain transmitted frames and reduce the transmitted audio channels.

With this contextual example in mind, in one embodiment of the present invention, data is received and its quality of service is analyzed. Then, based on this analysis and on received user preferences, the receiver formulates a suggestion for the encoder to alter the characteristics of the transmitted data. Finally, the receiver transmits this suggestion to the transmitter.

DESCRIPTION OF THE INVENTION

The present invention relates to methods and systems for improving the quality of displayed data that has been transmitted over a network. For the purposes of the present invention, the word quality refers to the audio and visual characteristics of displayed data.

Figure 1:
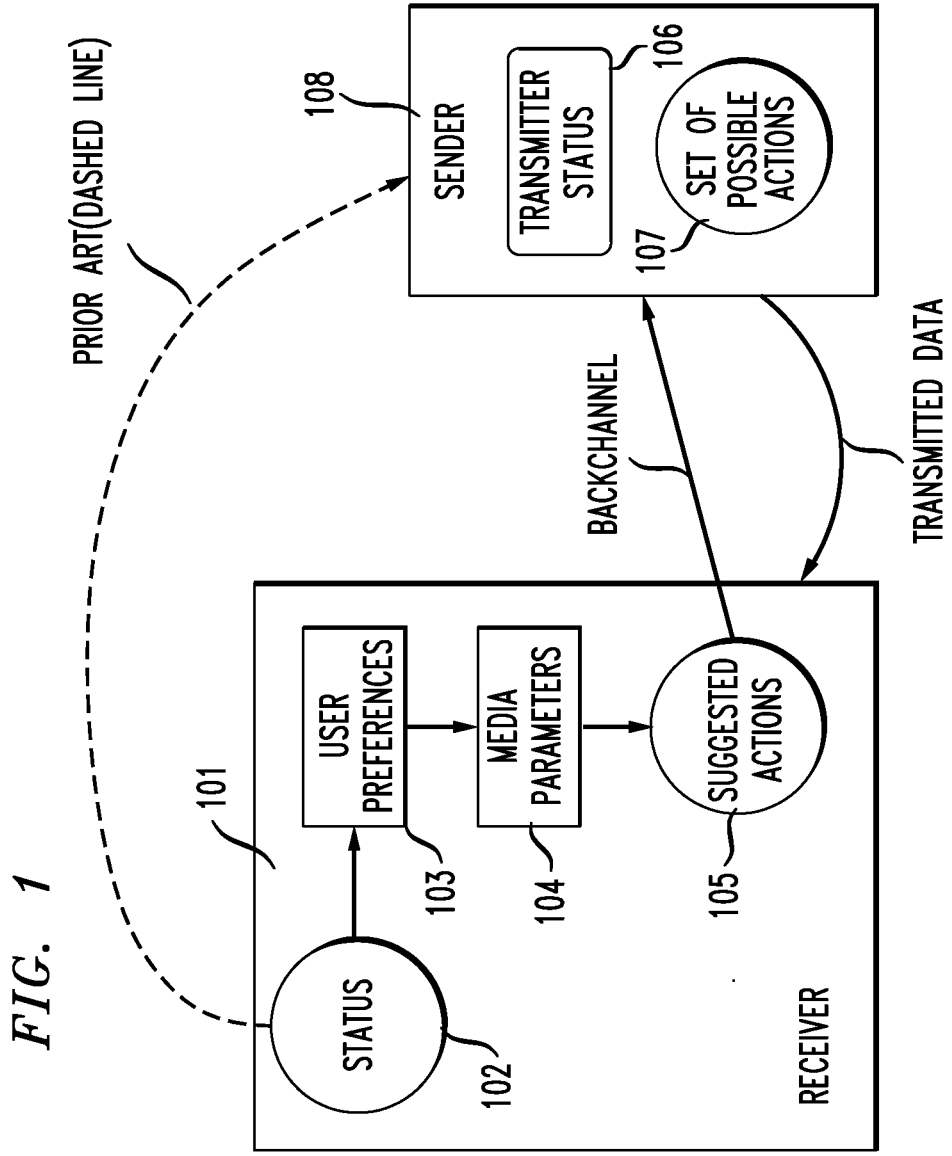
FIG. 1 is a system overview of an embodiment of the present invention.

A Referring now in detail to the drawings, FIG. 1 illustrates a system overview of an embodiment of the present invention. As a context for the present invention, but not the only context, consider Sender 108 to be a multimedia data server that transmits high-quality multimedia data to a client. The client can use a backchannel to interact with the server, analyzing a set of parameters that represent the quality of the transmitted data, comparing the quality to a set of user preferences, and formulating a set of suggestions that are fed back to the server to alter the data such that the quality of the displayed data is affected In one embodiment of the present invention, as displayed in FIG. 1, sender 108 transmits data to a receiver 101 which then displays the data. At 102, receiver 101 analyzes the quality of the display. At 103, a set of user preferences is received, and at 104, the quality analysis is compared to the user preferences. At 105, suggested actions are formulated and fed back along the backchannel to sender 108. When sender 108 receives the suggestions, sender 108 checks its status 106 and matches its current status with a set of possible actions 107. An action is chosen and the transmitted data is altered accordingly.

Figure 2:
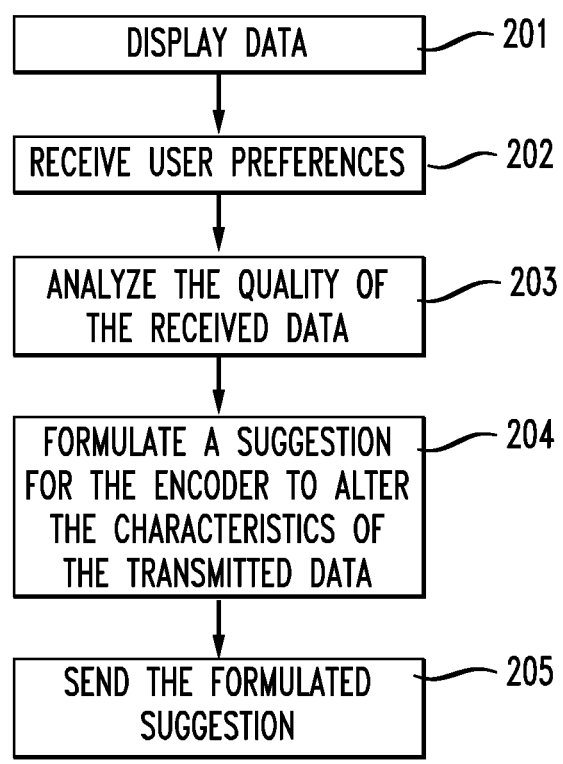
FIG. 2 is a flow chart illustrating an embodiment of a method according to the present invention.

FIG. 2 is a flow chart illustrating an embodiment of a method according to the present invention. In this embodiment, at step 201, received data is displayed at the receiver. For the purposes of this invention, the word "received" includes, but is not limited to, "created," "generated," and "selected." Therefore, the displayed data in step 201 may be received from an outside source, but it may also be, for example, internally generated. In one embodiment of the present invention, the displayed data is audiovisual, or multimedia, data.

At step 202, user preferences are received. In one embodiment of the present invention, the user preferences can specify preferences to improve the quality of the display. For example, the user preference can include data that says, in effect, "when I am busy, degrade audio, degrade video, and drop texture." In one embodiment of the present invention, the user preferences can be altered by the user during the transmission. In another embodiment of the present invention, the user preferences are fixed after the transmission begins.

At step 203, a set of parameters that represent the quality of the displayed data is analyzed. In one embodiment of the present invention, the set of parameters includes system load. For example, but not the only example, assuming a seven-bit word, zero can represent no load, and one hundred twenty seven can represent the system being completely busy. In another embodiment of the present invention, the set of parameters includes component load, where a component is chosen from the set comprising the central-processing unit (CPU), the graphics card, and the texture-mapping engine.

At step 204, a suggestion is formulated for the sender to alter the characteristics of the transmitted data. The suggestion is formulated by comparing the results of the analysis of the displayed data to the user preferences. The user preferences set some threshold for various parameters, and if the results of the analysis falls outside of that threshold, the receiver suggests to the sender to change various parameters of the transmitted data.

In one embodiment of the present invention, the formulated suggestion includes timing information identifying the point in time where the data was collected, and timing information identifying the point in time when the suggested action should be honored.

In another embodiment of the present invention, the formulated suggestion includes a suggestion to alter the rate at which frames are transmitted for display. In another embodiment of the present invention, the formulated suggestion includes altering the color depth. In another embodiment of the present invention, the formulated suggestion includes a suggestion to alter the window size. For the purposes of the present invention, "window size" means how much screen size area the scene covers. As an example, but not the only example, assume that the displayed scene covers the entire screen, but because of limited memory, the quality of the display is degraded. The formulated suggestion can include a suggestion to reduce the size of the display, thereby decreasing the need for computing power at the receiver and increasing the quality of the display.

In another embodiment of the present invention, the formulated suggestion includes a suggestion to alter audio channel characteristics. For the purposes of the present invention, the phrase "audio channel characteristics" includes bandwidth, number of audio channels, and spatial audio capabilities. As an example, but not the only example, assume that the quality of the display is degraded due to memory constraints at the receiver. The formulated suggestion can then include a suggestion that the sender decrease the number of audio channels broadcast, thereby decreasing the need for computing power at the receiver and increasing the quality of the display.

In another embodiment of the present invention, the formulated suggestion includes a suggestion to alter the graphics hardware load. For the purposes of the present invention, the phrase "graphics hardware load" includes, but is not limited to, matrix multiplication, texture mapping, and texture mapping memory.

In another embodiment of the present invention, the formulated suggestion includes a suggestion to alter the CPU load or the RAM amount available.

Figure 3:
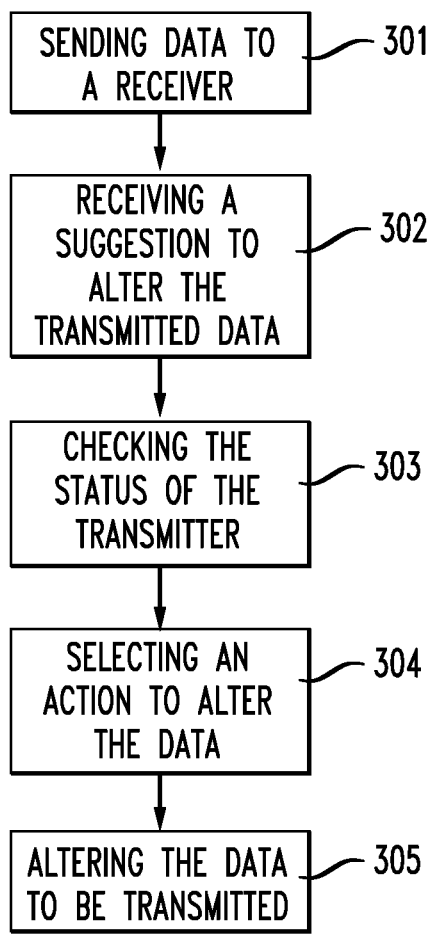
FIG. 3 is a flow chart illustrating another embodiment of a method according to the present invention.

FIG. 3 is a flow chart illustrating another embodiment of the present invention. At 301, data is sent by a sender to a receiver. In one embodiment of the present invention, the data sent at 301 is audiovisual, or multimedia data. In response to this sent data, the sender receives a suggestion at 302 to alter the transmitted data. In one embodiment of the present invention, the received suggestion includes timing information identifying the point in time where the data was collected, and timing information identifying the point in time when the suggested action should be honored.

In another embodiment of the present invention, the received suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The received suggestion can include a suggestion to reduce the size of the display, thereby decreasing the need for computing power at the receiver and increasing the quality of the display.

In another embodiment of the present invention, the received suggestion includes a suggestion to alter audio channel characteristics. As an example, but not the only example, assume that the quality of the display is degraded due to memory constraints at the receiver. The received suggestion can then include a suggestion that the sender decrease the number of audio channels broadcast, thereby decreasing the need for computing power at the receiver and increasing the quality of the display.

In another embodiment of the present invention, the received suggestion includes a suggestion to alter the graphics hardware load. In another embodiment of the present invention, the received suggestion includes a suggestion to alter the CPU load or the RAM amount available.

At step 303, the status is checked, and based on the current status and the received suggestion, at step 304, an action is selected from a set of actions, and the transmitted data is altered accordingly.

Figure 4:
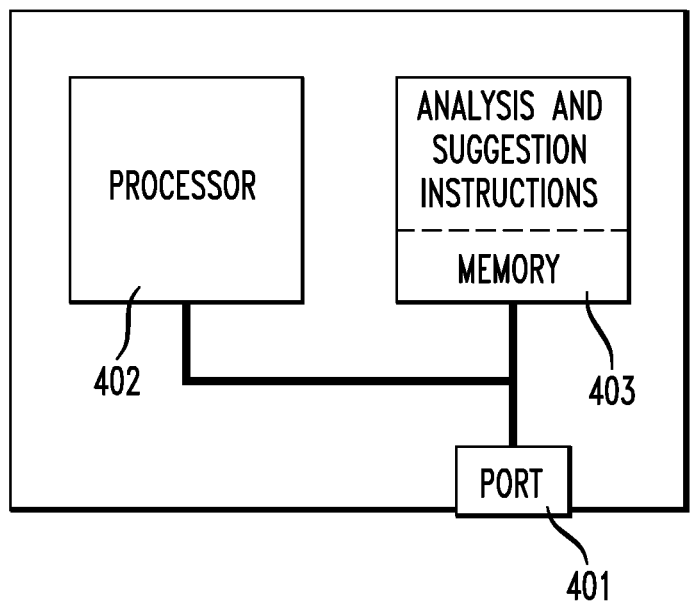
FIG. 4 is a pictorial representation of an apparatus according to one embodiment of the present invention.

FIG. 4 is a pictorial representation of an apparatus according to one embodiment of the present invention. The apparatus includes a port 401 coupled to processor 402, and memory 403, also coupled to processor 402 and to port 401. In one embodiment of the present invention, memory 403 stores instructions adapted to be executed by the processor to display received data, analyze the quality of the displayed data, formulate a suggestion for the encoder to alter the characteristics of data to be received, and then send, through port 401, the formulated suggestion to alter the quality of the received data.

For the purposes of this application, memory includes any medium capable of storing instructions adapted to be executed by a processor. Some examples of such media include, but are not limited to, floppy disks, CDROM, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, the memory stores instructions adapted to be run on the processor to receive a user preference to be used in the analysis. In another embodiment of the present invention, the formulated suggestion includes timing information identifying when the data was collected, and timing information identifying when the suggested action should be honored.

In another embodiment of the present invention, the formulated suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The formulated suggestion can include a suggestion to reduce the size of the display, thereby decreasing the need for computing power at the receiver and increasing the quality of the display.

In another embodiment of the present invention, the formulated suggestion includes a suggestion to alter audio channel characteristics. As an example, but not the only example, assume that the quality of the display is degraded due to memory constraints at the receiver. The formulated suggestion can then include a suggestion that the sender decrease the number of audio channels broadcast, thereby decreasing the need for computing power at the receiver and increasing the quality of the display.

In another embodiment of the present invention, the formulated suggestion includes a suggestion to alter the graphics hardware load. In another embodiment of the present invention, the formulated suggestion includes a suggestion to alter the CPU load or the RAM amount available.

Figure 5:
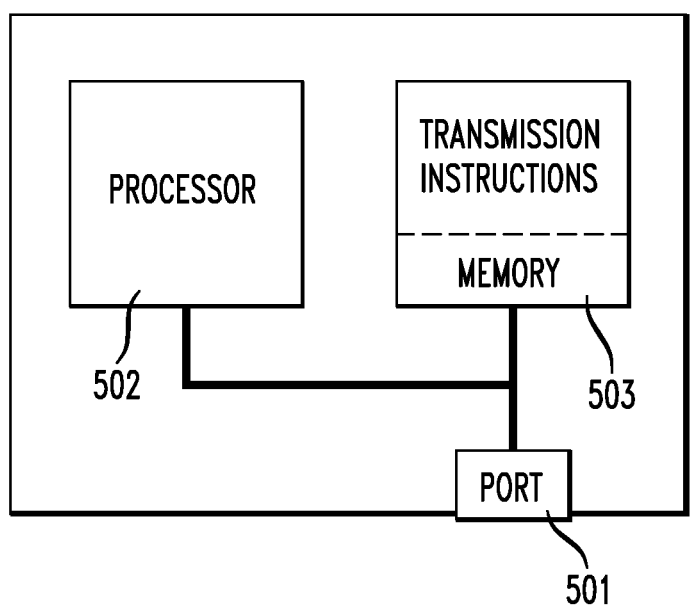
FIG. 5 is a pictorial representation of another apparatus according to one embodiment of the present invention.

FIG. 5 is a pictorial representation of an embodiment of the present invention. In one embodiment of the present invention, port 501 is coupled to processor 502, and memory 503 is coupled to port 501 and processor 502. Memory 503 contains transmission instructions adapted to be run on the processor to transmit data to a receiver, receive a suggestion to alter the transmitted data, and then decide to alter the transmitted data.

In one embodiment of the present invention, the received suggestion includes timing information identifying the point in time where the data was collected, and timing information identifying the point in time when the suggested action should be honored.

In another embodiment of the present invention, the received suggestion includes a suggestion to alter the rate at which frames are transmitted for display. In another embodiment of the present invention, the received suggestion includes a suggestion to alter the color depth. In another embodiment of the present invention, the received suggestion includes a suggestion to alter the window size. As an example, but not the only example, assume that the displayed scene covers the entire screen, but because of limited memory, the quality of the display is degraded. The received suggestion can include a suggestion to reduce the size of the display, thereby decreasing the need for computing power at the receiver and increasing the quality of the display.

In another embodiment of the present invention, the received suggestion includes a suggestion to alter audio channel characteristics. As an example, but not the only example, assume that the quality of the display is degraded due to memory constraints at the receiver. The received suggestion can then include a suggestion that the sender decrease the number of audio channels broadcast, thereby decreasing the need for computing power at the receiver and increasing the quality of the display.

In another embodiment of the present invention, the received suggestion includes a suggestion to alter the graphics hardware load. In another embodiment of the present invention, the received suggestion includes a suggestion to alter the CPU load or the RAM amount available.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method comprising:
   transmitting first data;
   receiving a media-parameter suggestion based on an analysis of a display of the first data and a user display quality preference, wherein the analysis is independent of network conditions;
   altering, via a processor, a characteristic of additional data to be transmitted based on the media-parameter suggestion, to yield second data; and
   transmitting the second data for display.

2. The method of claim 1, wherein the analysis comprises analyzing parameters associated with a quality of the first data.

3. The method of claim 2, wherein the analysis further comprises analyzing load information associated with the display of the first data.

4. The method of claim 3, wherein the load information is associated with a central-processing unit, a graphics card, and a texture mapping engine.

5. The method of claim 1, wherein the media-parameter suggestion comprises timing information associated with collection of the first data.

6. The method of claim 5, wherein the media-parameter suggestion further comprises a time to honor the media-parameter suggestion.

7. The method of claim 1, wherein the media-parameter suggestion comprises a suggestion to perform one of altering a frame rate, altering a color depth, altering a window size, altering audio channel characteristics, altering a graphics hardware load, altering a central-processing unit load, and altering an available memory.

8. The method of claim 1, wherein the analysis determines an improvement in quality at the display which will occur by implementing the media-parameter suggestion.

9. The method of claim 1, wherein the characteristic comprises one of a bandwidth, a number of audio channels, and a special audio capability.

10. A system comprising:
    a processor; and
    a computer-readable storage medium having instructions stored which, when executed by the processor, cause the processor to perform operations comprising:
    transmitting first data;
    receiving a media-parameter suggestion based on an analysis of a display of the first data and a user display quality preference, wherein the analysis is independent of network conditions;
    altering a characteristic of additional data to be transmitted based on the media-parameter suggestion, to yield second data; and
    transmitting the second data for display.

11. The system of claim 10, wherein the analysis comprises analyzing parameters associated with a quality of the first data.

12. The system of claim 11, wherein the analysis further comprises analyzing load information associated with the display of the first data.

13. The system of claim 12, wherein the load information is associated with a central-processing unit, a graphics card, and a texture mapping engine.

14. The system of claim 10, wherein the media-parameter suggestion comprises timing information associated with collection of the first data.

15. The system of claim 14, wherein the media-parameter suggestion further comprises a time to honor the media-parameter suggestion.

16. The system of claim 10, wherein the media-parameter suggestion comprises a suggestion to perform one of altering a frame rate, altering a color depth, altering a window size, altering audio channel characteristics, altering a graphics hardware load, altering a central-processing unit load, and altering an available memory.

17. The system of claim 10, wherein the analysis determines an improvement in quality at the display will occur by implementing the media-parameter suggestion.

18. The system of claim 10, wherein the characteristic comprises one of a bandwidth, a number of audio channels, and a special audio capability.

19. A computer-readable storage device having instructions stored which, when executed by a computing device, cause the computing device to perform operations comprising:
- transmitting first data;
- receiving a media-parameter suggestion based on an analysis of a display of the first data and a user display quality preference, wherein the analysis is independent of network conditions;
- altering a characteristic of additional data to be transmitted based on the media-parameter suggestion, to yield second data; and
- transmitting the second data for display.

20. The computer-readable storage device of claim 19, wherein the analysis comprises analyzing parameters associated with a quality of the first data.

\* \* \* \* \*